United States Patent
Lee et al.

(10) Patent No.: US 6,956,735 B2
(45) Date of Patent: Oct. 18, 2005

(54) VERTICALLY ADJUSTABLE RACK MOUNTED DISPLAY ASSEMBLY

(75) Inventors: Daniel G. Lee, Austin, TX (US); Randolph D. Gray, Round Rock, TX (US); Eric C. Wobig, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 10/769,211

(22) Filed: Jan. 30, 2004

(65) Prior Publication Data

US 2005/0168926 A1 Aug. 4, 2005

(51) Int. Cl.⁷ .................................................. G06F 1/16
(52) U.S. Cl. .................. 361/683; 361/724; 361/727; 361/682; 211/134; 312/223.1; 312/223.2; 248/121
(58) Field of Search ............................... 361/679–686, 361/724–727; 312/223.1, 223.2, 333; 211/134–174; 248/121–126

(56) References Cited

U.S. PATENT DOCUMENTS

| | | |
|---|---|---|
| 5,056,672 A | 10/1991 | Yamada ..................... 211/149 |
| 5,351,176 A | 9/1994 | Smith Stephen W. et al. ........................ 361/681 |
| 5,850,539 A | 12/1998 | Cook et al. ................. 395/500 |
| 5,941,615 A * | 8/1999 | Ito et al. ..................... 312/7.2 |
| 6,201,690 B1 * | 3/2001 | Moore et al. ............... 361/683 |
| 6,222,507 B1 | 4/2001 | Gouko .......................... 345/1 |
| 6,233,138 B1 * | 5/2001 | Osgood ...................... 361/681 |
| 6,307,547 B1 | 10/2001 | Bolnick ...................... 345/351 |
| 6,353,532 B1 | 3/2002 | Landrum et al. ........... 361/683 |
| 6,385,037 B2 * | 5/2002 | Howell et al. .............. 361/683 |
| 6,463,940 B1 | 10/2002 | Thomas et al. .............. 134/56 |
| 6,532,146 B1 | 3/2003 | Duquette .................... 361/681 |
| 6,563,700 B1 | 5/2003 | Waller et al. ............... 361/683 |
| 6,726,164 B1 * | 4/2004 | Baiza et al. ........... 248/222.12 |
| 2004/0228077 A1 * | 11/2004 | Hall et al. .................. 361/681 |

* cited by examiner

*Primary Examiner*—Lynn Feild
*Assistant Examiner*—Anthony Q. Edwards
(74) *Attorney, Agent, or Firm*—Baker Botts L.L.P.

(57) ABSTRACT

A vertically adjustable display assembly includes a display and support arms movable between a storage position and a viewing position. The display assembly also includes rotation support brackets slidably attached to slots formed in the support arms such that as the display assembly rotates from the viewing position to the storage position, the rotation support bracket will position the display with respect to the support arms to be properly position with respect to a keyboard to be placed in the storage position.

20 Claims, 5 Drawing Sheets

FIG. 5

VERTICALLY ADJUSTABLE RACK MOUNTED DISPLAY ASSEMBLY

RELATED APPLICATION

This application is related to co-pending application Ser. No. 10/768,822 entitled "Rack Mounted Keyboard and Display Assembly" filed Jan. 30, 2004.

TECHNICAL FIELD

The present invention relates in general to electronic systems and more particularly to a vertically adjustable rack mounted display assembly and method of use thereof.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many environments information handling systems are stored in racks. For instance, in data center environments racks, including racks compliant with standard EIA-310, are used to house multiple servers and other information handling system components. Racks are typically divided into a multiple vertical sections, also referred to as "U's". Components are then typically designed to fit within a vertical envelope corresponding to a number of U's. For instance, a 2U server is designed to fit within an 2U vertical space. In order to allow a user to interact with the rack mounted information handling system many information handling systems provide a keyboard-display component mounted within the rack.

Some current keyboard-displays components (which may also be referred to as a keyboard-display assembly or a Keyboard Monitor Mouse (KMM)), include a display stored in a horizontal position, in a common horizontal plane with the keyboard and positioned behind the keyboard. Accordingly, a user must fully extend the keyboard-display component from the rack and then reach behind the display to pull the display up to a viewing position. This can be cumbersome work for shorter users who have a limited reach. Also the monitor viewing angle may be limited by the vertical position of the keyboard-display component within the rack.

In existing keyboard-display components the display typically includes a screen such as an LCD screen. When the unit is stored within a storage position behind the keybaord, the LCD screen is typically facing upward. The upward facing LCD is then at risk of being damaged by components or other objects falling onto the LCD screen.

In some instances, depending upon the vertical placement of the keyboard-display within the rack the viewing angle of the display for users of different heights is not optimal and the distance between the keyboard and the display is often not optimized from a usability and viewability standpoint.

Other available keyboard-display devices incorporate a so-called "clam shell" design with the display component folded over the keyboard during storage. One disadvantage of this design is that it effectively doubles the vertical rack space required for storage of the clam shell style keyboard-display component.

SUMMARY

Therefore, a need has arisen for a keyboard-display component that is easily usable and visible to users of different heights.

In accordance with teachings of the present disclosure a system and method are described for providing a keyboard-display assembly that overcomes the problems associated with previous keyboard-display assemblies. The present disclosure provides a display assembly including a tray that is moveably mounted within a rack. The display assembly includes a first display support arm and second display support arm. The display assembly is moveable between a storage position and a viewing position where, in the storage position, the display is in a generally horizontal position with the screen face of the display facing downward and positioned forward of the keyboard within the tray. In the viewing position, the display assembly rotated into a generally vertical position. In the vertical position, the display is vertically adjustable and may be moved with respect to the support arms. Rotation support brackets are secured to the tray and to slots formed in each support arm. The top end of the rotation support brackets slide along the slots as the display assembly is moved from the viewing position to the storage position, thereby contacting pushing the display to an appropriate position with respect to the support arms to be placed in the storage position.

In one aspect, the an information handling system comprising is disclosed that includes a rack and a tray slidably mounted within the rack and movable between a retracted position and an extended position. The tray has a keyboard portion for installing a keyboard. A display assembly is mounted to the tray and includes a first support arm, a second support arm, a display, a first rotation support bracket and a second rotation support bracket. The first support arm is pivotally connected to the tray and has a first longitudinal slot. The second support arm is pivotally connected to the tray and has a second longitudinal slot. The display is slidably attached to the first support arm and the second support arm. The first rotation support bracket is pivotally connected at a first end to the tray and slidably connected at a second end to the first slot. Additionally, the second rotation support bracket is pivotally connected at its first end to the tray and slidably connected at its second end to the second slot.

In another aspect, a keyboard-display assembly for use within a rack system is disclosed. The keyboard-display assembly includes a tray sized for installation within a rack system that also has a portion for installing a keyboard. A display assembly is mounted to the tray and includes a first support arm, a second support arm, a display, a first rotation support bracket and a second rotation support bracket. The first support arm is pivotally connected to the tray and has a first longitudinal slot. The second support arm is pivotally connected to the tray and has a second longitudinal slot. The display is slidably attached to the first support arm and the second support arm. The first rotation support bracket is pivotally connected at a first end to the tray and slidably connected at a second end to the first slot. Additionally, the second rotation support bracket is pivotally connected at its first end to the tray and slidably connected at its second end to the second slot.

In yet another aspect a method for providing a keyboard-display apparatus in a rack system is disclosed. The method includes providing a display assembly and pivotally mounting the display assembly to a tray. The method also provides for pivotally mounting a first end of a first rotation support bracket to the tray and slidably mounting a second end of the first rotation support bracket to the first slot of a support arm. Then selectively positioning the display assembly in a storage position where the display is positioned forward of a keyboard installed within the tray, the display in a generally horizontal position and a screen-face of the display having a downward facing orientation. The method also includes selectively rotating the display assembly to a generally vertical viewing position.

The present disclosure includes a number of important technical advantages. One technical advantage is including a display assembly incorporating one or more rotational support brackets. The rotational support brackets provide additional support to support arms and urge the display into an appropriate position relative to the support bracket to by rotated from a viewing position into a storage position.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
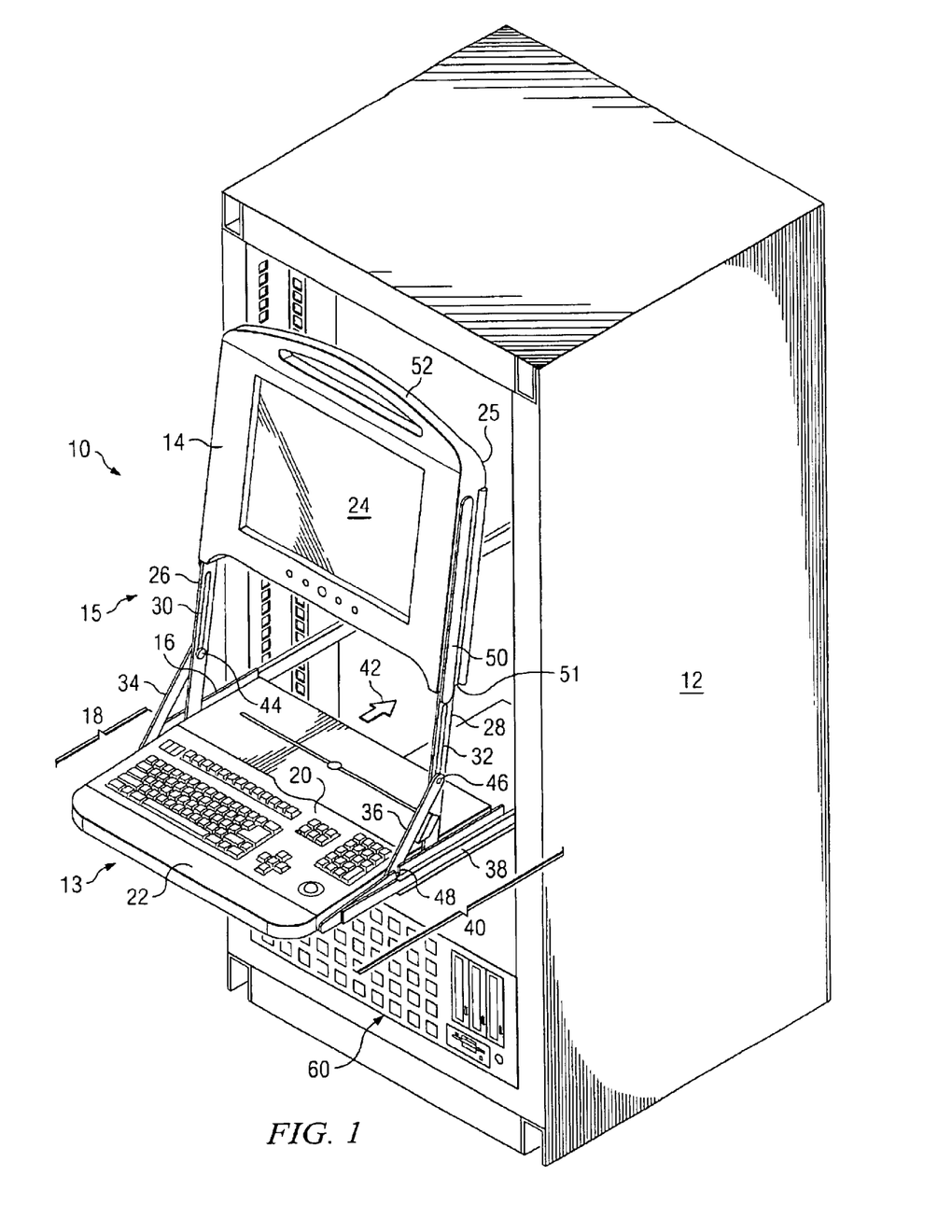
FIG. 1 shows a keyboard-display assembly installed within a rack system and shown in a generally vertical viewing position.

Now referring to FIG. 1, information handling system 10 includes a rack 12 for storing infomation handling system components such as component 60 and keyboard-display assembly 13. Keyboard-display assembly 13 includes tray 16, keyboard 20, palmrest 22, display 14, first support arm 26 and second support arm 28.

In the present embodiment, rack 12 is preferably compliant with EIA-310 or another suitable standard for electronic or computer equipment racks. Component 60 and tray 16 are preferably installed within rack 12 using slide assemblies such as slide assemblies 38. In the present embodiment, each slide assembly includes an inner slide, an intermediate slide, and an outer (or stationary) slide where the inner slide and intermediate slide may telescope outward from the outer slide. Keyboard-display 13 (via tray 16) is preferably attached to the inner slide, which allows tray 16 to extend forward into an extended position 40, as shown, and a retracted position in the direction of arrow 42.

In the present embodiment, tray 16 is attached to slide assembly 38. Tray 16 includes a keyboard portion 18 formed to allow a keyboard to be installed thereon. Keyboard 16 and palmrest 22 are both disposed on tray 22, with keyboard 16 being disposed within keyboard portion 18 and palmrest disposed forward of keyboard 20. Although not expressly shown, the cabling associated with keyboard 16 (as well as cabling associated with display 14) are preferably contained in a cable management assembly as are known to those of skill in the art, that extends and retracts as keyboard-display assembly 13 moves forward into extended position 40 or is retracted in the direction of arrow 42 with rack 12.

In alternate embodiments, tray 16 and keyboard 20 may be integrated into a single component. Also, in the present embodiment keyboard 20 includes an integrated pointing device (here, a roller ball type device). In alternate embodiments, a separate pointing device component may be installed within tray 16. In other alternate embodiments, palmrest 22 may not be included or may be integrated into tray 16 or keyboard 20.

In the present embodiment the area directly behind the keyboard serves three purposes. It contains and shrouds the pivots that control the rotation of display assembly 15. It also contains and shrouds the power transformer that converts AC power to DC power for display 14. Last of all, it serves as a cable routing and strain relief area for the power cables, keyboard cables, mouse cables, and video cables associated with keyboard-display assembly 13.

Display assembly 15 includes display 14 supported by first support arm 26 and second support arm 28. In the present embodiment (and as further described below) display 14 is movable with respect to first support arm 26 and second support arm 28. Accordingly, as display assembly 15 is in its second, generally vertical viewing position (as shown), display 14 may be adjusted vertically by slidably traversing up or down support arms 26 and 28. In the present preferred embodiment, display 14 has an adjustment range of approximately 4.5 inches with respect to support arms 26 and 28. However, in alternate embodiments, display 14 may be fixed with respect support arms 26 and 28 or may have a greater or lesser adjustment range with respect to support arms 26 and 28.

Figure 3:
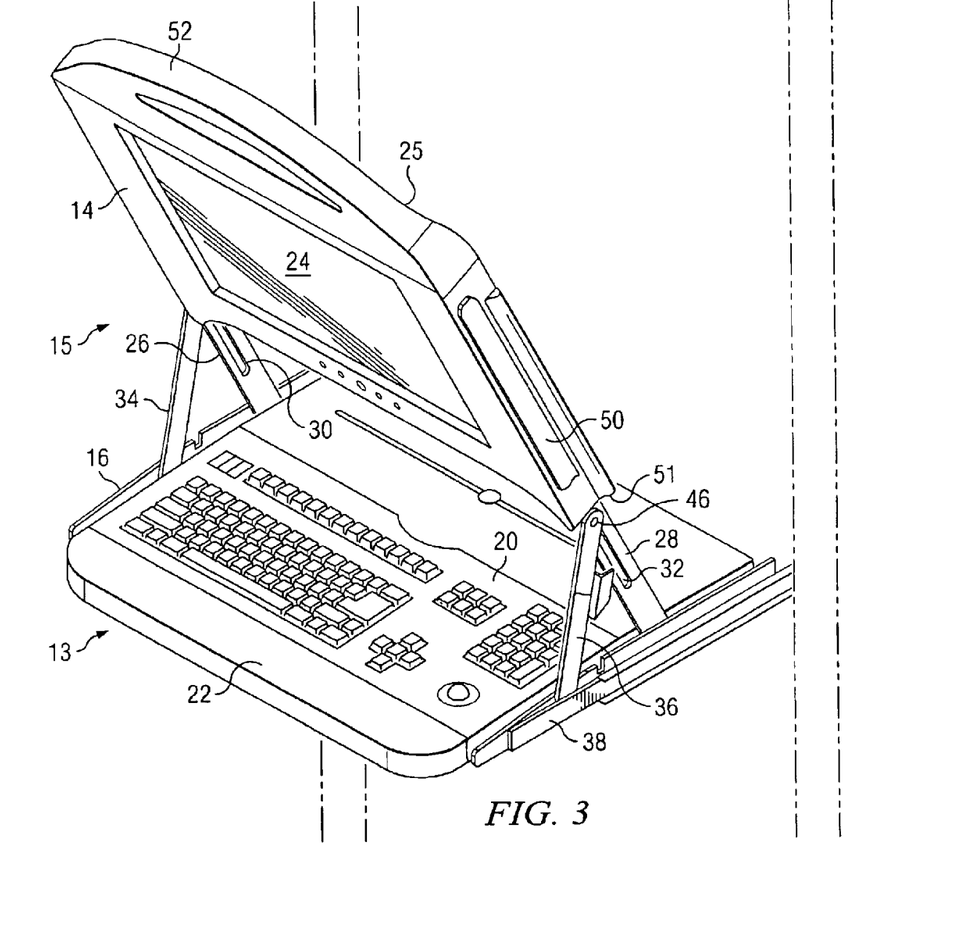
FIG. 3 shows a display assembly rotated between a viewing position and a storage position according to teachings of the present disclosure.

Display assembly 15 is pivotally mounted to tray 16 such the display assembly may move between a first, generally horizontal storage position (as shown in FIG. 3) and a generally vertical viewing position as shown in FIG. 1. Display 14 further includes screen face 24 and rear face 25. In the second, viewing position, screen face 24 is viewable to a user standing in front of keyboard-display assembly 13. In the first, generally horizontal storage position, display 14 is disposed in generally the same vertical envelope as tray 16 and keyboard 20 with screen face 24 facing downward and rear face 25 facing upward. In this manner, screen face 24 will be protected from objects falling from above, such as components being installed in or removed from rack 12. Additionally, by positioning display 14 forward of keyboard 20, display 14 is advantageously accessible to a user who is pulling keyboard-display assembly 13 from rack and moving 14 to a viewing position.

Figure 2:
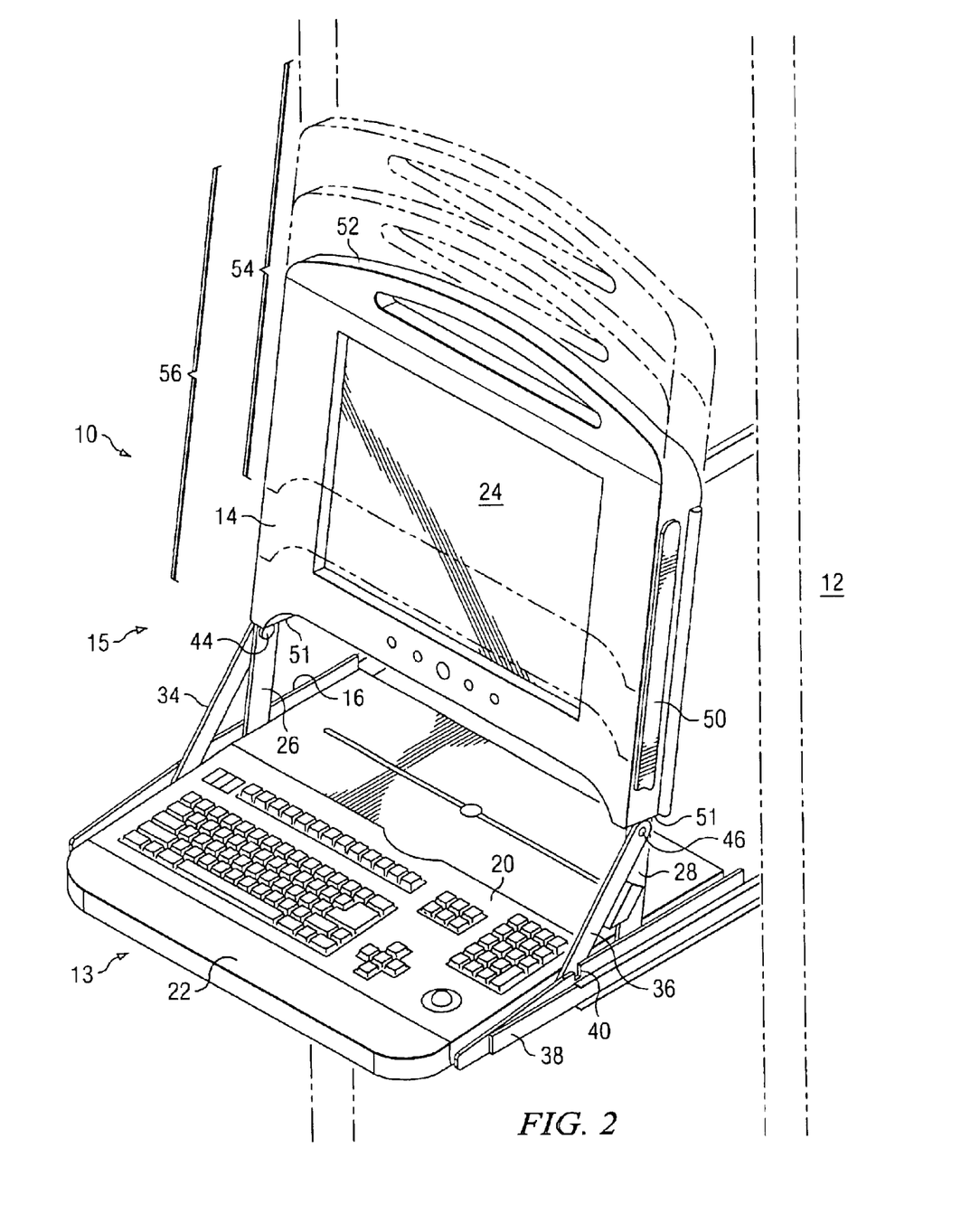
FIG. 2 shows a keyboard-display assembly with a vertically adjustable display component.
Figure 4:
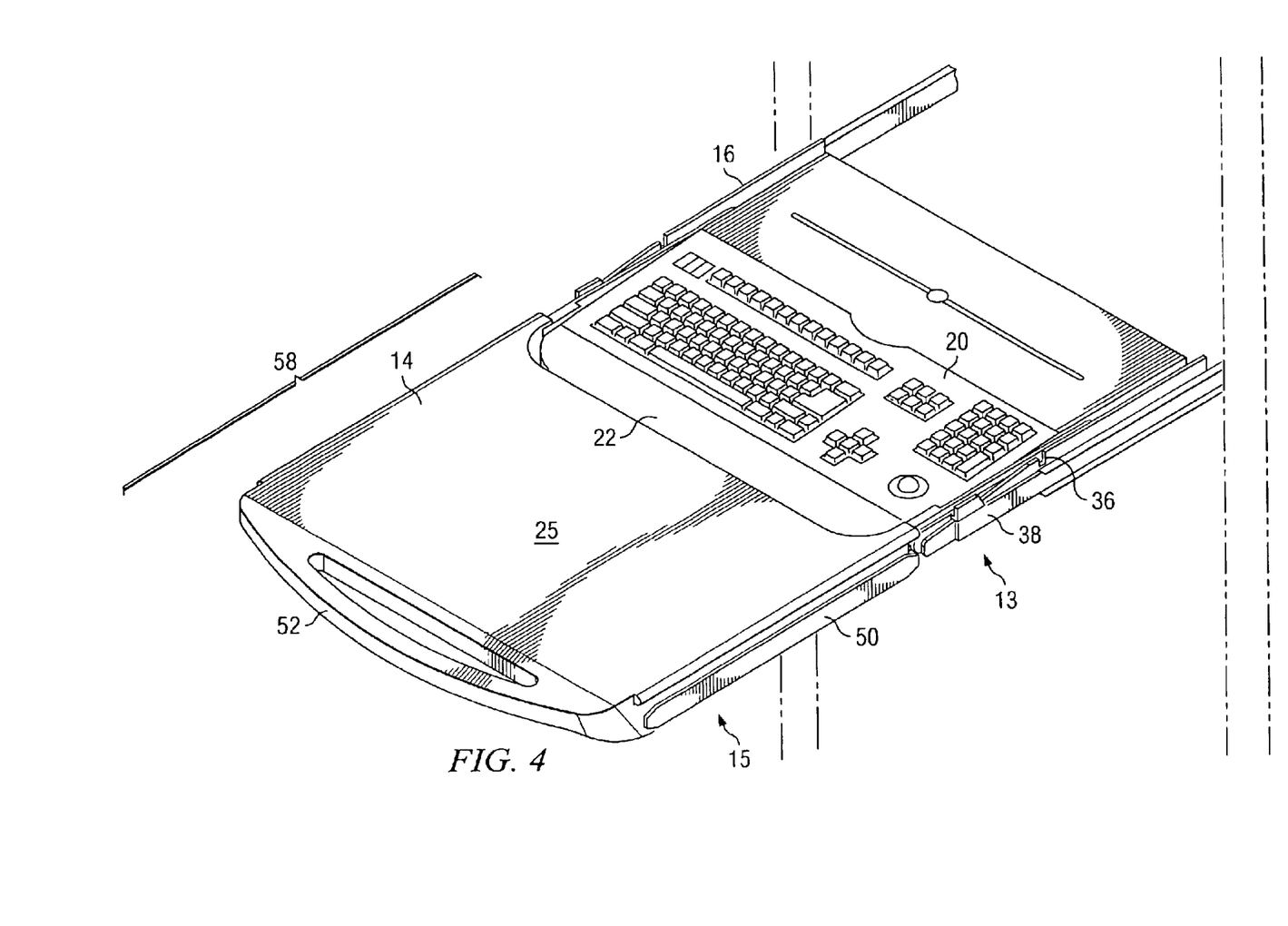
FIG. 4 shows a keyboard-display assembly extending from a rack with the display assembly in a generally horizontal storage position.

In the present embodiment, display 14 includes handle 52 integrated into the body of display 14 to facilitate moving keyboard-display assembly between extended position 40 (as shown) and retracted position (not expressly shown) and to rotate display assembly 15 between its generally horizontal storage position (as shown in FIGS. 3 and 4) and its generally vertical viewing position (as shown in FIGS. 1 and 2). In the present embodiment, display assembly 15 may rotate up from the generally horizontal storage position up to 102 degrees. Accordingly, the generally vertical viewing positioning of display assembly 15 encompasses any position of display assembly in which display 14 may be operatively viewed by a user standing in front of keyboard-display assembly 13.

Also in the present embodiment, first support arm 26 and second support arm 28 are each additionally supported by first rotation support bracket 34 and second rotation support bracket 36. In the present embodiment, a first end of support arms 26 and 28 are pivotally attached to tray 16 in a position behind keyboard portion 18. Rotation support brackets 34 and 38 are pivotally secured to tray 16 about a first end 44 (note that the first end of first rotation support bracket 34 is not expressly shown) in a position forward of each respective support arm 26 and 28. First support arm 26 has a first longitudinal slot 30 formed in the lower portion thereof. Second support arm 28 has a corresponding second longitudinal slot 32 formed in the lower portion thereof.

The operation of first rotation support bracket 34 and second rotation support bracket correspond and the description of the operation of second rotation support bracket 36 applies in a corresponding manner to the operation of first rotation support bracket 34 (as well as second end 44 of first rotation support bracket 34). Second rotation support bracket 36 is pivotally connected at a first end 48 to tray 16 and slidably connected at its second end 46 to slot 33. Accordingly, as display assembly 15 rotates, the position of second end 46 of second rotation support bracket 36 will travel along the length of slot 32.

As display assembly 15 is rotated to the maximum angle of rotation of the viewing position (as shown) second end 46 rests at the base of slot 32 and helps prevent keyboard-display assembly 15 from extending beyond the maximum angle of rotation of the viewing position. As display assembly 15 is rotated into the generally horizontal storage position, second end 46 will travel upwards along slot 32. In the event that display has been lowered with respect to support arms 26 and 28 (as shown in FIG. 2), as display assembly 15 is rotated forward, the second end 46 of second rotation support bracket 36 contacts a bottom portion 51 of display 14. As display assembly 15 is further rotated, second end 46 of second rotation support bracket 36 pushes display 14 to extend to the maximum extension of second rotation support bracket 36 with respect to second slot 32. Accordingly, second rotation support bracket 28 will position display 14 to allow it to rotate into the generally horizontal storage position (as shown in FIGS. 3 and 4) without interfering with or otherwise contacting tray 16, keyboard 20, or palmrest 22.

Now referring to FIG. 2, keyboard-display assembly 13, movable from a first vertical position 54 to a second vertical position 56, is shown. As used herein, the terms "first vertical position" and "second vertical position" refer not only to the generally vertical adjustment of display 14 when display-assembly is in a generally vertical viewing position (as shown) but applies to any movement of display 14 with respect to support arms 26 and 28. Accordingly, movement of display 14 between first vertical position 54 and second vertical position 56 may take place as display assembly 15 is partially rotated toward the generally horizontal storage position.

Now referring to FIG. 3, display assembly 15 rotated between the viewing position and the storage position is shown. As described above, as display assembly 15 rotates toward the storage position, second end 46 of rotation support bracket 36 travels upward within slot 32. In the event that display 14 was lowered with respect to support arms 26 and 28, second end 46 will contact bottom portion 51 of monitor 14. As display assembly continues to rotate toward the storage position, second end 46 acts to push display 14 forward in such that display 14 may advance to the storage position without contacting keyboard 20, palm rest 22, or tray 16.

Now referring to FIG. 4, a depiction of display assembly 15 is shown in a storage position 58. As shown, display assembly is rotated into a generally horizontal storage position 58, forward of keyboard 20, tray 16, and palmrest 22. As shown, display assembly 15 as well as tray 16, keyboard 20, and palmrest 22 are all in a common vertical envelope. In the present embodiment, keyboard-display assembly may preferably be installed within rack 12 in a 1U envelope. Also shown, rear face 25 is facing in an upward orientation (and screen face 24 is facing in a downward orientation) thereby protecting screen face 24 from falling objects.

Figure 5:
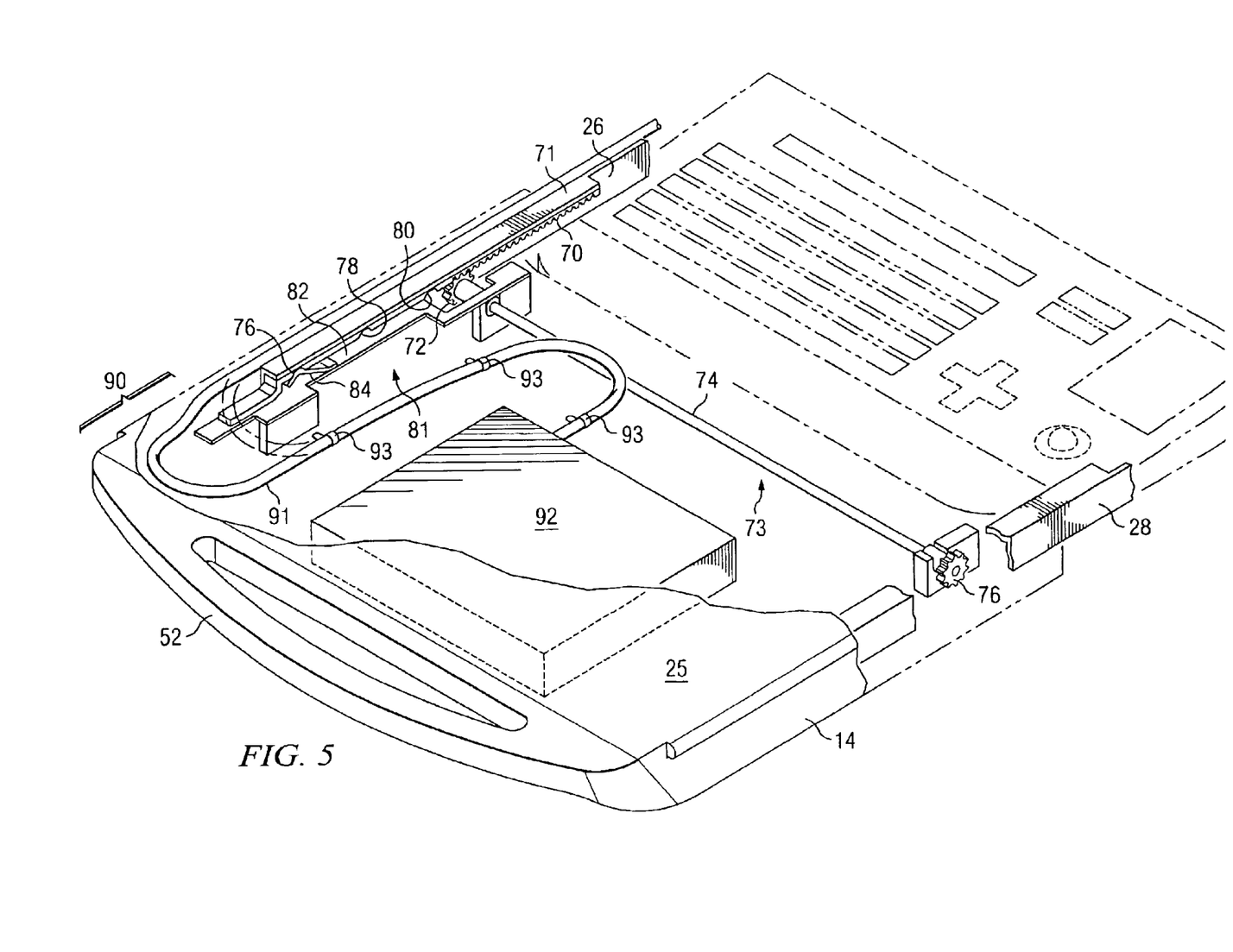
FIG. 5 shows a rear portion of a display with the back panel removed, showing a gear assembly to facilitate vertical adjustment of the display.

Now referring to FIG. 5, a depiction of keyboard-display assembly 15 with portions of rear face 25 removed is shown. As shown, first support arm 26 and second support arm 28 extend into the body of display 14. Display 14 includes gear assembly 73 that interfaces with support arms 26 and 28 to allow display 14 to move with respect to support arms 26 and 28.

As shown, first support arm 26 also includes upper portion 71 that includes first gear rack 70 at its lower end and first detent 76, second detent 78, and third detent 80 at its upper end. Gear rack 70 interfaces with first gear 72 of gearing assembly 73. Detents 76, 78, and 80 may preferably interface with detent assembly to secure display 14 with respect to first support arm 26. It should be noted that in the present embodiment, second support arm 28 interfaces with second gear 76 in a corresponding fashion and includes corresponding detents that interface with a similarly corresponding detent assembly (not expressly shown). In alternate embodiments, only a single detent assembly and gear assembly may be use to selectively position display 14 with respect to support arm 26 or 28.

Gearing assembly 73 includes first gear 72 attached to a first end of rod 74 and second gear 76 attached to the second end of rod 74. In the present embodiment, gears 72 and 76 are fixed with respect to rod 74, such that if gear 72 rotates, gear 74 will rotate an equal amount. Accordingly, both sides of display 14 will preferably traverse along the gear racks 70 (and its corresponding gear rack-not expressly shown) of support arms 26 and 28 in unison, thereby preventing indexing of display 14 as it moves with respect to support arms 26 and 28. Preferably, the friction between gears 72 and 76 and the gear racks 70 provides sufficient friction to retain display 14 in a particular vertical position 54 or 56, or any point in between (as described above).

In the present embodiment, display 14 also includes a first detent assembly 81 (and a corresponding second detent assembly, not expressly shown) that may secure display 14 with respect to first support arm 26 and second support arm 28. First detent assembly 81 includes fixed bracket 82, and leaf spring 84. Bracket 82 is fixed within display 14 and leaf spring 84 is fixed to bracket 82. Leaf spring 84 is further formed to rest within detents 76, 78, or 80. Accordingly, as display 14 is moved with respect to first support arm 26, leaf spring 84 travels adjacent to upper portion 71 of first support arm 26. As the interface portion of leaf spring 84 aligns with detents 76, 78, 80, a user may stop the movement of display 14 with respect to support arms 26 and 28 and allow the interface between leaf spring 84 and the detent in use to secure display 14 relative to support arms 26 and 28.

In the present embodiment, the pressure exerted by leaf spring 84 against detents 76, 78, or 80 is operable to hold display 14 in place with respect to support arms 26 and 28, and will also be displaced with a small amount of force exerted by a user to adjust the position of display 14 relative to support arms 26 and 28. The present embodiment includes three detents 76, 78, and 80. In alternate embodiments more or fewer detents may be included.

Also shown in the present embodiment are display electronics housing 92 connected to cabling 91. As shown cable 91 is a VGA cable and is fixed to the display housing with tabs 93. In particular, cable 91 is attached to form service loop 90 such that a sufficient length of cabling is disposed within the housing of display 14 to facilitate movement of display 14 with respect to support arms 26 and 28. Additional cabling associated with display 14 (such as power cables or other appropriate cables) may also include a service loop.

In operation, a user may find keyboard-display assembly 15 stored in a rack system 12, with the display assembly in a storage position. The user may access the keyboard-display assembly by pulling the keyboard-display assembly to extended position 40. In the present embodiment, the user may preferably accomplish this using handle 52. Next a user may move display assembly from its generally horizontal storage position to a generally vertical viewing position. As described above, display assembly 15 may rotate up to 102 degrees from the generally horizontal storage position. The user preferably rotates display assembly to a desired angle. In the present embodiment, the user may then adjust display 14 relative to support arms 26 and 28.

When a user is finished using keyboard-display 13, the user may rotate display assembly 15 forward to the storage position. In the present embodiment, if display 14 has been lowered with respect to support arms 26 and 28, rotation support brackets 34 and 36 act to push display 14 to extend along support arms 26 and 28 sufficiently to extend past tray 16, keyboard 20, and palm rest 22.

Although the disclosed embodiments have been described in detail, it should be understood that various changes, substitutions and alterations can be made to the embodiments without departing from their spirit and scope.

What is claimed is:

1. An information handling system comprising:
   a rack;
   a tray slidably mounted within the rack and movable between a retracted position and an extended position;
   the tray having a keyboard portion for installing a keyboard component;
   a display assembly mounted to the tray, the display assembly comprising:
     a first support arm pivotally connected to the tray and having a first longitudinal slot formed therein;
     a second support arm pivotally connected to the tray and having a second longitudinal slot formed therein;
     a display slidably attached to the first support arm and the second support arm;
     a first rotation support bracket pivotally connected at a first end to the tray and slidably connected at a second end to the first slot; and
     a second rotation support bracket pivotally connected at a first end to the tray and slidably connected at a second end to the second slot.

2. The system of claim 1 further comprising:
   the display having a screen-face and a rear-face, the display assembly movable between a storage position and a viewing position;
   the storage position comprising the display positioned forward of the keyboard portion in a generally horizontal position and the screen-face having a downward facing orientation; and
   the viewing position comprising the display assembly rotated into a generally vertical position.

3. The system of claim 2 wherein, the viewing position further comprises:
   the second end of the first rotation support bracket positioned adjacent a bottom end of the first slot; and
   the second end of the second rotation support bracket positioned adjacent a bottom end of the second slot.

4. The system of claim 2 further comprising the second end of the first rotation support bracket operable to slide upward along the first slot as the display assembly rotates from the viewing position to the storage position.

5. The system of claim 4 further comprising the second end of the second rotation support bracket operable to slide upward along the second slot as the display assembly rotates from the viewing position to the storage position.

6. The system of claim 4 further comprising:
   the display selectively movable with respect to the first support arm and the second support arm such that in the viewing position the display may be vertically adjusted; and
   the second end of the first rotation bracket operable to contact an edge portion of the display as the display assembly is rotated from the viewing position to the storage position.

7. The system of claim 6 further comprising the second end of the first rotation bracket operable to urge the display forward to facilitate movement of the display assembly into the storage position.

8. The system of claim 2 further comprising a palmrest disposed in the tray forward of the keyboard, the storage position further comprising the display positioned forward of the palmrest.

9. The system of claim 2, the viewing position further comprising the display assembly rotated at least 90° upward from the generally horizontal storage position.

10. The system of claim 2 wherein the viewing position comprises the display assembly rotated up to approximately 102° from the generally horizontal storage position.

11. The system of claim 2 further comprising a handle integrated into the display operable to move the display between the storage position and the viewing position.

12. The system of claim 2 further comprising:
the display selectively movable with respect to the first support arm and the second support arm such that in the viewing position the display may be vertically adjusted;
the first arm further comprises a first gear rack;
the second arm further comprises a second gear rack;
the display further comprises a gear assembly comprising a first gear fixed to a first end of a rod and a second gear fixed to a second end of a rod;
the first gear operable to interface with the first gear rack; and
the second gear formed to interface with the second gear rack.

13. The system of claim 12 further comprising the first arm and the second arm each having at least two detents, each operable to interface with a detent assembly associated with the display to selectively retain the display with respect to the first arm and the second arm.

14. A keyboard-display assembly for use within a rack system comprising:
a tray sized for installation within a rack system and having a keyboard portion for installing a keyboard component;
a display assembly mounted to the tray, the display assembly comprising:
a first display support arm pivotally connected to the tray and having a longitudinal slot formed therein;
a second display support arm pivotally connected to the tray and having a longitudinal slot formed therein;
a display slidably attached to the first support arm and the second support arm;
a first rotation support bracket pivotally connected at a first end to the tray and slidably connected at a second end to the first slot; and
a second rotation support bracket pivotally connected at a first end to the tray and slidably connected at a second end to the second slot.

15. The display assembly of claim 14 further comprising:
the display having a screen-face and a rear-face, the display assembly movable between a storage position and a viewing position;
the storage position comprising the display positioned forward of the keyboard portion in a generally horizontal position and the screen-face having a downward facing orientation; and
the viewing position comprising the display assembly rotated into a generally vertical position.

16. The system of claim 15 further comprising the second end of the first rotation support bracket operable to slide upward along the first slot as the display assembly rotates from the viewing position to the storage position.

17. The system of claim 16 further comprising:
the display selectively movable with respect to the first support arm and the second support arm such that in the viewing position the display may be vertically adjusted; and
the second end of the first rotation bracket operable to contact an edge portion of the display as the display assembly is rotated from the viewing position to the storage position.

18. A method for providing a keyboard-display apparatus in a rack system comprising:
providing a display assembly having a first support arm with a first slot formed therein, a second support arm with a second slot formed therein, and a display slidably mounted to the first support arm and the second support arm;
pivotally mounting the display assembly to a tray, movable between a retracted position and an extended position;
pivotally mounting a first end of a first rotation support bracket to the tray and slidably mounting a second end of the first rotation support bracket to the first slot;
pivotally mounting a first end of a second rotation support bracket to the tray and slidably mounting a second end of the second rotation support bracket to the second slot;
selectively positioning the display assembly in a storage position comprising the display positioned forward of a keyboard installed within the tray, the display in a generally horizontal position and a screen-face of the display having a downward facing orientation; and
selectively rotating the display assembly to a generally vertical viewing position.

19. The method of claim 18 further comprising slidably mounting the second end of the first rotation support bracket to the first slot such that the second end of the first rotation support bracket slides upward along the first slot as the display assembly rotates from the viewing position to the storage position.

20. The method of claim 19 further comprising slidably mounting the second end of the first rotation bracket operable to contact an edge portion of the display as the display assembly is rotated from the viewing position to the storage position.

* * * * *

UNITED STATES PATENT AND TRADEMARK OFFICE
CERTIFICATE OF CORRECTION

PATENT NO. : 6,956,735 B2
DATED : October 18, 2005
INVENTOR(S) : Lee et al.

It is certified that error appears in the above-identified patent and that said Letters Patent is hereby corrected as shown below:

Title page,
Item [73], Assignee, delete "Dell Products, L.P." and replace with -- Dell Products L.P. --.

Signed and Sealed this

Twenty-seventh Day of December, 2005

JON W. DUDAS
*Director of the United States Patent and Trademark Office*